United States Patent
Li et al.

(10) Patent No.: US 12,092,754 B2
(45) Date of Patent: Sep. 17, 2024

(54) DETECTION OR CORRECTION FOR MULTIPATH REFLECTION

(71) Applicant: Aurora Innovation, Inc., Palo Alto, CA (US)

(72) Inventors: Bo Li, Pittsburgh, PA (US); James Curry, Bozeman, MT (US); Shaogang Wang, Pittsburgh, PA (US)

(73) Assignee: Aurora Operations, Inc, Pittsburgh, PA (US)

( * ) Notice: Subject to any disclaimer, the term of this patent is extended or adjusted under 35 U.S.C. 154(b) by 524 days.

(21) Appl. No.: 17/229,338

(22) Filed: Apr. 13, 2021

(65) Prior Publication Data

US 2022/0326343 A1    Oct. 13, 2022

(51) Int. Cl.
    G01S 7/02      (2006.01)
    G01S 7/48      (2006.01)
    G01S 13/86     (2006.01)
    G01S 13/931    (2020.01)

(52) U.S. Cl.
    CPC ............ G01S 7/021 (2013.01); G01S 7/4804 (2013.01); *G01S 13/865* (2013.01); *G01S 13/931* (2013.01)

(58) Field of Classification Search
    CPC ...... G01S 7/021; G01S 7/4804; G01S 13/865; G01S 13/931
    USPC ......................................................... 702/159
    See application file for complete search history.

(56) References Cited

U.S. PATENT DOCUMENTS

| | | |
|---|---|---|
| 2008/0158058 A1 | 7/2008 | Struckman et al. |
| 2012/0039422 A1 | 2/2012 | Stayton |
| 2017/0031003 A1 | 2/2017 | Dougherty et al. |
| 2022/0042838 A1* | 2/2022 | So ........................... G01S 13/88 |

FOREIGN PATENT DOCUMENTS

| | | | | |
|---|---|---|---|---|
| CN | 112292085 A  * | 1/2021 | ......... | A61B 5/02007 |
| DE | 112008000797 B4 * | 8/2020 | ........... | G01S 13/931 |
| EP | 3588128 A1 | 1/2020 | | |
| KR | 101790864 | 10/2017 | | |
| KR | 101792114 | 10/2017 | | |

OTHER PUBLICATIONS

English translation of DE 112008000797, Aug. 2020. (Year: 2020).*
English translation of CN 112292085, Jan. 2021. (Year: 2021).*
International Search Report and Written Opinion, issued for PCT/US2022/020158, mailed Jun. 29, 2022, 14 pgs.
International Preliminary Report on Patentability, issued for PCT/US2022/020158, mailed Oct. 26, 2023, 7 pgs.

* cited by examiner

*Primary Examiner* — Michael P Nghiem
(74) *Attorney, Agent, or Firm* — PATENT LAW WORKS LLP

(57) ABSTRACT

Ranging and detection data is processed to identify or correct for multipath reflection. A sensor point that represents a location of an object, the location based on an incidence of an electromagnetic wave received at a sensor is obtained. The first sensor point is determined to be a product of multipath reflection. A first point of reflection on a surface of a surface model is determined. The location of the first sensor point is corrected based on the first point of reflection on the surface of the surface model.

20 Claims, 9 Drawing Sheets

DETECTION OR CORRECTION FOR MULTIPATH REFLECTION

BACKGROUND

Detection and ranging systems may include a transmitter to transmit electromagnetic waves, a receiver to receive electromagnetic waves reflected off an object back to the receiver, and processing to determine a property of the object reflecting the electromagnetic waves. For example, a property such as the speed or distance of the object may be determined. Different detection and ranging systems may use different portions of the electromagnetic spectrum, for example, radio detection and ranging "RADAR" uses radio waves (e.g., pulsed or continuous) and light detection and ranging "LIDAR" uses light (e.g., infrared light).

SUMMARY

This specification relates to methods and systems for detecting or correcting for multipath reflection. According to one aspect of the subject matter described in this disclosure, a method includes obtaining a first sensor point that represents a location of an object, the location based on an incidence of an electromagnetic wave received at a sensor; determining that the first sensor point is a product of multipath reflection, determining a first point of reflection on a surface of a surface model, and correcting the location of the first sensor point based on the first point of reflection on the surface of the surface model.

In general, another aspect of the subject matter described in this disclosure includes a system comprising one or more processors and memory operably coupled with the one or more processors, wherein the memory stores instructions that, in response to the execution of the instructions by one or more processors, cause the one or more processors to perform the operations of obtain a first sensor point that represents a location of an object, the location based on an incidence of an electromagnetic wave received at the sensor; determine that the first sensor point is a product of multipath reflection, determine a first point of reflection on a surface of a surface model, and correct a location of the first sensor point based on the first point of reflection on the surface of the surface model.

Other implementations of one or more of these aspects include corresponding systems, apparatus, and computer programs, configured to perform the actions of the methods, encoded on computer storage devices.

These and other implementations may each optionally include one or more of the following features. For instance, the multipath reflection includes a reflection of the electromagnetic wave at the object and one or more other surfaces before the electromagnetic wave is received at the sensor. For instance, determining the first sensor point is the product of multipath reflection is based on the location of the first sensor point relative to the surface of the surface model. For instance, the features may include: obtaining a second sensor point; determining that the second sensor point is the product of multipath reflection; determining a second point of reflection on the surface of the surface model; and correcting a location of the second sensor point based on the second point of reflection on the surface. For instance, the features may include determining the first point of reflection on the surface using at least one of a binary search or a linear step progression. For instance, the features may include transforming the first sensor point and the surface model into a common coordinate system. For instance, correcting the location of the first sensor point based on the first point of reflection on the surface may include: determining a surface plane at the first point of reflection on the surface of the surface model; and mirroring the first sensor point across the surface plane at the first point of reflection. For instance, determining the surface plane at the first point of reflection on the surface of the surface model may include: querying a neighborhood of the first point of reflection on the surface of the surface model; and computing a normal associated with the surface plane based on the neighborhood of the first point of reflection on the surface of the surface model. For instance, the electromagnetic wave is one of light, where the sensor includes a light detection and ranging (LIDAR) sensor; and a radio wave, where the sensor includes a radio detection and ranging (RADAR) sensor. For instance, the features may include that the first sensor point is determined to be the product of multipath reflection when an altitude of the first sensor point is determined to be below an altitude of the surface of the surface model, where the surface model is a model of a ground surface, and the surface model is based on a three-dimensional map.

BRIEF DESCRIPTION OF THE DRAWINGS

These and other aspects and features of the present implementations become apparent upon review of the following description of specific implementations in conjunction with the accompanying figures, wherein.

DETAILED DESCRIPTION

A challenge to automotive detection and ranging (e.g., RADAR and LIDAR) arises from multipath, also referred to herein as "multipath reflection." Multipath is relative to a direct path between the sensor and an object. A direct path is a path where an electromagnetic wave is reflected once between transmission of the electromagnetic wave by the detection and ranging sensor and reception of the electromagnetic wave at the detection and ranging sensor. For example, the electromagnetic wave (e.g., a radio wave, in the case of RADAR, or light, in the case of LIDAR) is emitted by a detection and ranging sensor along a path to an object, reflects at the object, and returns back to the sensor's receiver without any additional reflection. By contrast, multipath reflection occurs when an electromagnetic wave reflects at the object and one or more additional surfaces before being received by the sensor. For example, the electromagnetic wave reflects off a first object then a second object before being received by the sensor.

Automotive RADAR, for example, may experience multipath reflection caused by reflections at the ground, guardrails, other vehicles, etc. For example, a source of RADAR multipath is the ground reflection, which produces RADAR points underground. Some approaches eliminate or ignore sensor points produced by the multipath. For example, some approaches gate out underground sensor points during association. However, problems with approaches that provide no multipath detection or correction include: (1) a large amount of information and bandwidth are wasted, (2) some objects are occluded and only visible via multipath reflection, so ignoring such sensor points may cause a false negative, and (3) other points produced by multipath may cause false positives. It should be understood that while the present disclosure is described below in use cases to reduce the effect of multipath in RADAR and LIDAR, the present disclosure can be applied to many different implementations and other use cases, and is not limited to the particular usage and implementations described below.

Implementations of the disclosure are generally related to the use of a surface model to detect or correct sensor points resulting from multipath reflections. For example, a sensor point beyond (e.g., under or behind) the surface of the surface model is identified as resulting from multipath reflection. A sensor point identified as resulting from, or as being produced by, multipath reflection, may occasionally be referred to herein simply as a "multipath," "multipath reflection," or "multipath reflection point." When a multipath reflection point is identified, in some implementations, the point is corrected, for example, the point of reflection on the surface model is determined and the point is mirrored across a surface plane, which is estimated at the point of reflection.

Vehicle

Figure 1:
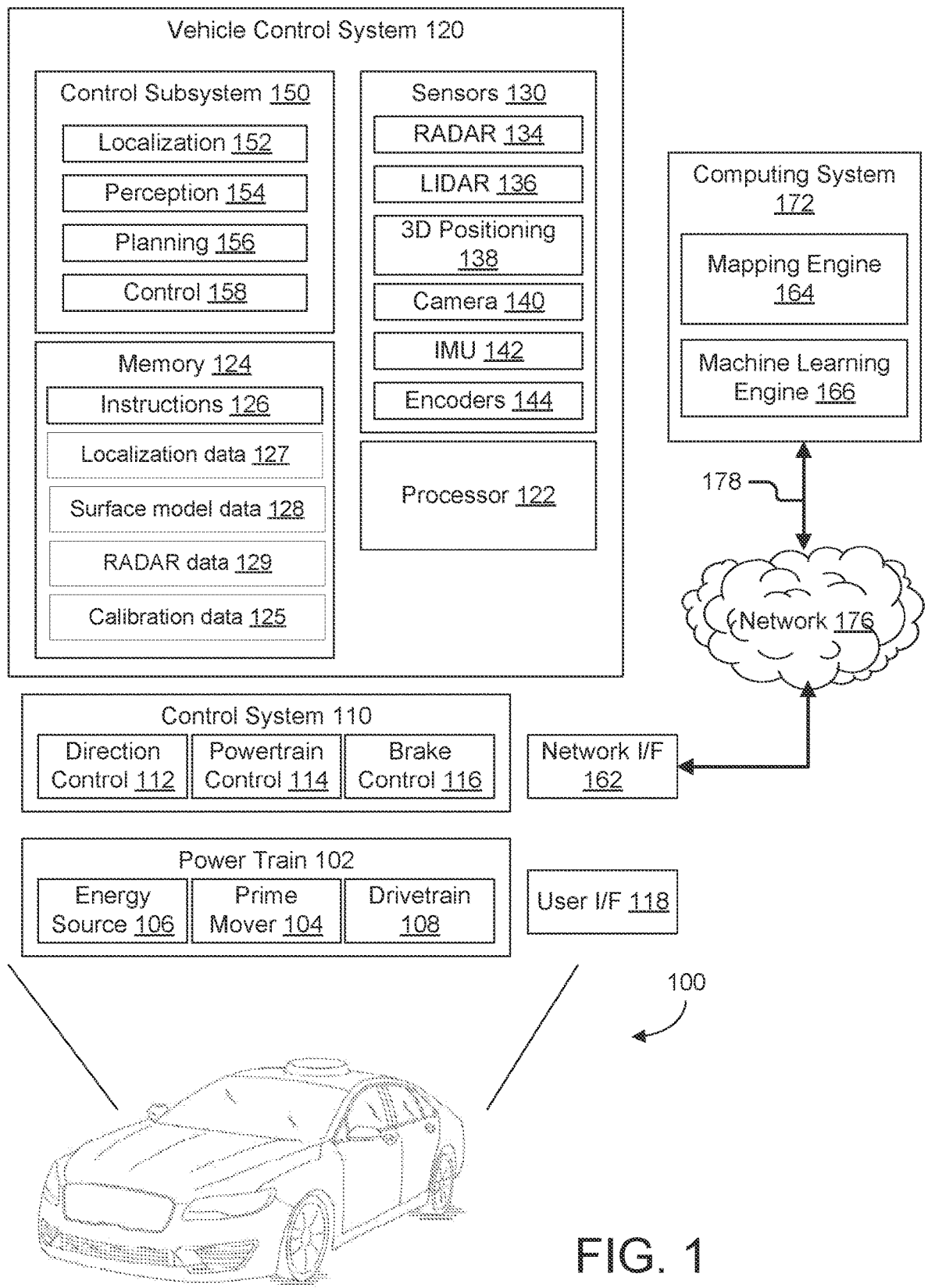
FIG. 1 is a block diagram illustrating an example of a hardware and software environment for an autonomous vehicle in accordance with some implementations.

Referring to the drawings, wherein like numbers denote like parts throughout the several views, FIG. 1 illustrates an example hardware and software environment for an autonomous vehicle 100 within which various techniques disclosed herein may be implemented. The vehicle 100, for example, may include a powertrain 102 including a prime mover 104 powered by an energy source 106 and capable of providing power to a drivetrain 108, as well as a control system 110 including a direction control 112, a powertrain control 114, and a brake control 116. The vehicle 100 may be implemented as any number of different types of vehicles, including vehicles capable of transporting people and/or cargo, and capable of traveling by land, and it will be appreciated that the aforementioned components 102-116 may vary widely based upon the type of vehicle within which these components are utilized.

For simplicity, the implementations discussed hereinafter will focus on a wheeled land vehicle such as a car, van, truck, bus, etc. In such implementations, the prime mover 104 may include one or more electric motors and/or an internal combustion engine (among others). The energy source 106 may include, for example, a fuel system (e.g., providing gasoline, diesel, hydrogen, etc.), a battery system, solar panels or other renewable energy source, and/or a fuel cell system. The drivetrain 108 includes wheels and/or tires along with a transmission and/or any other mechanical drive components suitable for converting the output of the prime mover 104 into vehicular motion, as well as one or more brakes configured to controllably stop or slow the vehicle 100 and direction or steering components suitable for controlling the trajectory of the vehicle 100 (e.g., a rack and pinion steering linkage enabling one or more wheels of the vehicle 100 to pivot about a generally vertical axis to vary an angle of the rotational planes of the wheels relative to the longitudinal axis of the vehicle). In some implementations, combinations of powertrains and energy sources may be used (e.g., in the case of electric/gas hybrid vehicles), and in other implementations multiple electric motors (e.g., dedicated to individual wheels or axles) may be used as a prime mover 104. In the case of a hydrogen fuel cell implementation, the prime mover 104 may include one or more electric motors and the energy source 106 may include a fuel cell system powered by hydrogen fuel.

The direction control 112 may include one or more actuators and/or sensors for controlling and receiving feedback from the direction or steering components to enable the vehicle 100 to follow a desired trajectory. The powertrain control 114 may be configured to control the output of the powertrain 102, e.g., to control the output power of the prime mover 104, to control a gear of a transmission in the drivetrain 108, etc., thereby controlling a speed and/or direction of the vehicle 100. The brake control 116 may be configured to control one or more brakes that slow or stop vehicle 100, e.g., disk or drum brakes coupled to the wheels of the vehicle.

Other vehicle types, including but not limited to all-terrain or tracked vehicles, and construction equipment, may utilize different powertrains, drivetrains, energy sources, direction controls, powertrain controls and brake controls. Moreover, in some implementations, some of the components can be combined, e.g., where directional control of a vehicle is primarily handled by varying an output of one or more prime movers. Therefore, implementations disclosed herein are not limited to the particular application of the herein-described techniques in an autonomous, wheeled, land vehicle.

In the illustrated implementation, full or semi-autonomous control over the vehicle 100 is implemented in a vehicle control system 120, which may include one or more processors 122 and one or more memories 124, with each processor 122 configured to execute program code instructions 126 stored in a memory 124. The processors(s) can include, for example, graphics processing unit(s) ("GPU(s)") and/or central processing unit(s) ("CPU(s)").

Sensors 130 may include various sensors suitable for collecting information from a vehicle's surrounding environment for use in controlling the operation of the vehicle 100. For example, sensors 130 can include one or more detection and ranging sensors (e.g., a RADAR sensor 134, a LIDAR sensor 136, or both), a 3D positioning sensor 138, e.g., a satellite navigation system such as GPS (Global Positioning System), GLONASS (Globalnaya Navigazionnaya Sputnikovaya Sistema, or Global Navigation Satellite System), BeiDou Navigation Satellite System (BDS), Galileo, Compass, etc. The 3D positioning sensors 138 can be used to determine the location of the vehicle on the Earth using satellite signals. The sensors 130 can optionally include a camera 140 and/or an IMU (inertial measurement unit) 142. The camera 140 can be a monographic or stereographic camera and can record still and/or video images. The IMU 142 can include multiple gyroscopes and accelerometers capable of detecting linear and rotational motion of the vehicle 100 in three directions. One or more encoders 144, such as wheel encoders may be used to monitor the rotation of one or more wheels of vehicle 100.

The outputs of sensors 130 may be provided to a set of control subsystems 150, including, a localization subsystem 152, a perception subsystem 154, a planning subsystem 156, and a control subsystem 158. The localization subsystem 152 is principally responsible for precisely determining the location and orientation (also sometimes referred to as "pose" or "pose estimation") of the vehicle 100 within its surrounding environment, and generally within some frame of reference. In some implementations, the pose is stored within the memory 124 as localization data 127. In some implementations, a surface model is generated from a high-definition map, and stored within the memory 124 as surface model data 128. In some implementations, the detection and ranging sensors store their sensor data in the memory 124, e.g., RADAR data point cloud is stored as RADAR data 129. In some implementations, calibration data 125 is stored in the memory 124. The perception subsystem 154 is principally responsible for detecting, tracking, and/or identifying objects within the environment surrounding vehicle 100. As described in more detail below with reference to FIG. 2, in some implementations, perception subsystem 154 comprises a multipath engine 202 to detect or correct for multipath reflection.

A machine learning model in accordance with some implementations can be utilized in tracking objects. The planning subsystem 156 is principally responsible for planning a trajectory or a path of motion for vehicle 100 over some timeframe given a desired destination as well as the static and moving objects within the environment. A machine learning model in accordance with some implementations can be utilized in planning a vehicle trajectory. The control subsystem 158 is principally responsible for generating suitable control signals for controlling the various controls in the vehicle control system 120 in order to implement the planned trajectory of the vehicle 100. Similarly, a machine learning model can be utilized to generate one or more signals to control the autonomous vehicle 100 to implement the planned trajectory.

It will be appreciated that the collection of components illustrated in FIG. 1 for the vehicle control system 120 is merely one example. Individual sensors may be omitted in some implementations. Additionally, or alternatively, in some implementations, multiple sensors of the same types illustrated in FIG. 1 may be used for redundancy and/or to cover different regions around a vehicle. Moreover, there may additional sensors of other types beyond those described above to provide actual sensor data related to the operation and environment of the wheeled land vehicle. Likewise, different types and/or combinations of control subsystems may be used in other implementations. Further, while subsystems 152-158 are illustrated as being separate from processor 122 and memory 124, it will be appreciated that in some implementations, some or all of the functionality of a subsystem 152-158 may be implemented with program code instructions 126 resident in one or more memories 124 and executed by one or more processors 122, and that these subsystems 152-158 may in some instances be implemented using the same processor(s) and/or memory. Subsystems may be implemented at least in part using various dedicated circuit logic, various processors, various field programmable gate arrays ("FPGA"), various application-specific integrated circuits ("ASIC"), various real time controllers, and the like, as noted above, multiple subsystems may utilize circuitry, processors, sensors, and/or other components. Further, the various components in the vehicle control system 120 may be networked in various manners.

In some implementations, the vehicle 100 may also include a secondary vehicle control system (not illustrated), which may be used as a redundant or backup control system for the vehicle 100. In some implementations, the secondary vehicle control system may be capable of fully operating the autonomous vehicle 100 in the event of an adverse event in the vehicle control system 120, while in other implementations, the secondary vehicle control system may only have limited functionality, e.g., to perform a controlled stop of the vehicle 100 in response to an adverse event detected in the primary vehicle control system 120. In still other implementations, the secondary vehicle control system may be omitted.

In general, different architectures, including various combinations of software, hardware, circuit logic, sensors, networks, etc. may be used to implement the various components illustrated in FIG. 1. Each processor may be implemented, for example, as a microprocessor and each memory may represent the random-access memory ("RAM") devices comprising a main storage, as well as any supplemental levels of memory, e.g., cache memories, non-volatile or backup memories (e.g., programmable or flash memories), read-only memories, etc. In addition, each memory may be considered to include memory storage physically located elsewhere in the vehicle 100, e.g., any cache memory in a processor, as well as any storage capacity used as a virtual memory, e.g., as stored on a mass storage device or another computer controller. One or more processors 122 illustrated in FIG. 1, or entirely separate processors, may be used to implement additional functionality in the vehicle 100 outside of the purposes of autonomous control, e.g., to control entertainment systems, to operate doors, lights, convenience features, correct for multipath reflections, etc.

In addition, for additional storage, the vehicle 100 may include one or more mass storage devices, e.g., a removable disk drive, a hard disk drive, a direct access storage device ("DASD"), an optical drive (e.g., a CD drive, a DVD drive, etc.), a solid-state storage drive ("SSD"), network attached storage, a storage area network, and/or a tape drive, among others.

Furthermore, the vehicle 100 may include a user interface 118 to enable vehicle 100 to receive a number of inputs from and generate outputs for a user or operator, e.g., one or more displays, touchscreens, voice and/or gesture interfaces, buttons and other tactile controls, etc. Otherwise, user input may be received via another computer or electronic device, e.g., via an app on a mobile device or via a web interface.

Moreover, the vehicle 100 may include one or more network interfaces, e.g., network interface 162, suitable for communicating with one or more networks 176 to permit the communication of information with other computers and electronic devices, including, for example, a central service, such as a cloud service, from which the vehicle 100 receives information including trained machine learning models and other data for use in autonomous control thereof. The one or more networks 176, for example, may be a communication network and include a wide area network ("WAN") such as the Internet, one or more local area networks ("LANs") such as Wi-Fi LANs, mesh networks, etc., and one or more bus subsystems. The one or more networks 176 may optionally utilize one or more standard communication technologies, protocols, and/or inter-process communication techniques. In some implementations, data collected by the one or more sensors 130 can be uploaded to a computing system 172 via the network 176 for additional processing.

In the illustrated implementation, the vehicle 100 may communicate via the network 176 and signal line 178 with a computing system 172. In some implementations, the computing system 172 is a cloud-based computing device. As described below in more detail with reference to FIG. 2, the multipath engine 202 is included in the perception subsystem 154 of the vehicle 100. In some implementations not shown in FIG. 1, the multipath engine 202 may be configured and executed on a combination of the computing system 172 and the vehicle control system 120 of the vehicle 100. In other implementations, either the computing system 172 or the vehicle control system 120 of the vehicle 100 alone executes the functionality of the multipath engine 202.

Each processor illustrated in FIG. 1, as well as various additional controllers and subsystems disclosed herein, generally operates under the control of an operating system and executes or otherwise relies upon various computer software applications, components, programs, objects, modules, data structures, etc., as will be described in greater detail below. Moreover, various applications, components, programs, objects, modules, etc. may also execute on one or more processors in another computer (e.g., computing system 172) coupled to vehicle 100 via network 176, e.g., in a distributed, cloud-based, or client-server computing environment, whereby the processing required to implement the functions of a computer program may be allocated to multiple computers and/or services over a network.

In general, the routines executed to implement the various implementations described herein, whether implemented as part of an operating system or a specific application, component, program, object, module or sequence of instructions, or even a subset thereof, will be referred to herein as "program code." Program code typically comprises one or more instructions that are resident at various times in various memory and storage devices, and that, when read and executed by one or more processors, perform the steps necessary to execute steps or elements embodying the various aspects of the present disclosure. Moreover, while implementations have and hereinafter are described in the context of fully functioning computers and systems, it will be appreciated that the various implementations described herein are capable of being distributed as a program product in a variety of forms, and that implementations can be implemented regardless of the particular type of computer readable media used to actually carry out the distribution.

Examples of computer readable media include tangible, non-transitory media such as volatile and non-volatile memory devices, floppy and other removable disks, solid state drives, hard disk drives, magnetic tape, and optical disks (e.g., CD-ROMs, DVDs, etc.) among others.

In addition, various program code described hereinafter may be identified based upon the application within which it is implemented in a specific implementation. However, it should be appreciated that any particular program nomenclature that follows is used merely for convenience, and thus the present disclosure should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the present disclosure is not limited to the specific organization and allocation of program functionality described herein.

The example environment illustrated in FIG. 1 is not intended to limit implementations disclosed herein. Indeed, other alternative hardware and/or software environments may be used without departing from the scope of implementations disclosed herein.

Multipath Engine 202

Figure 2:
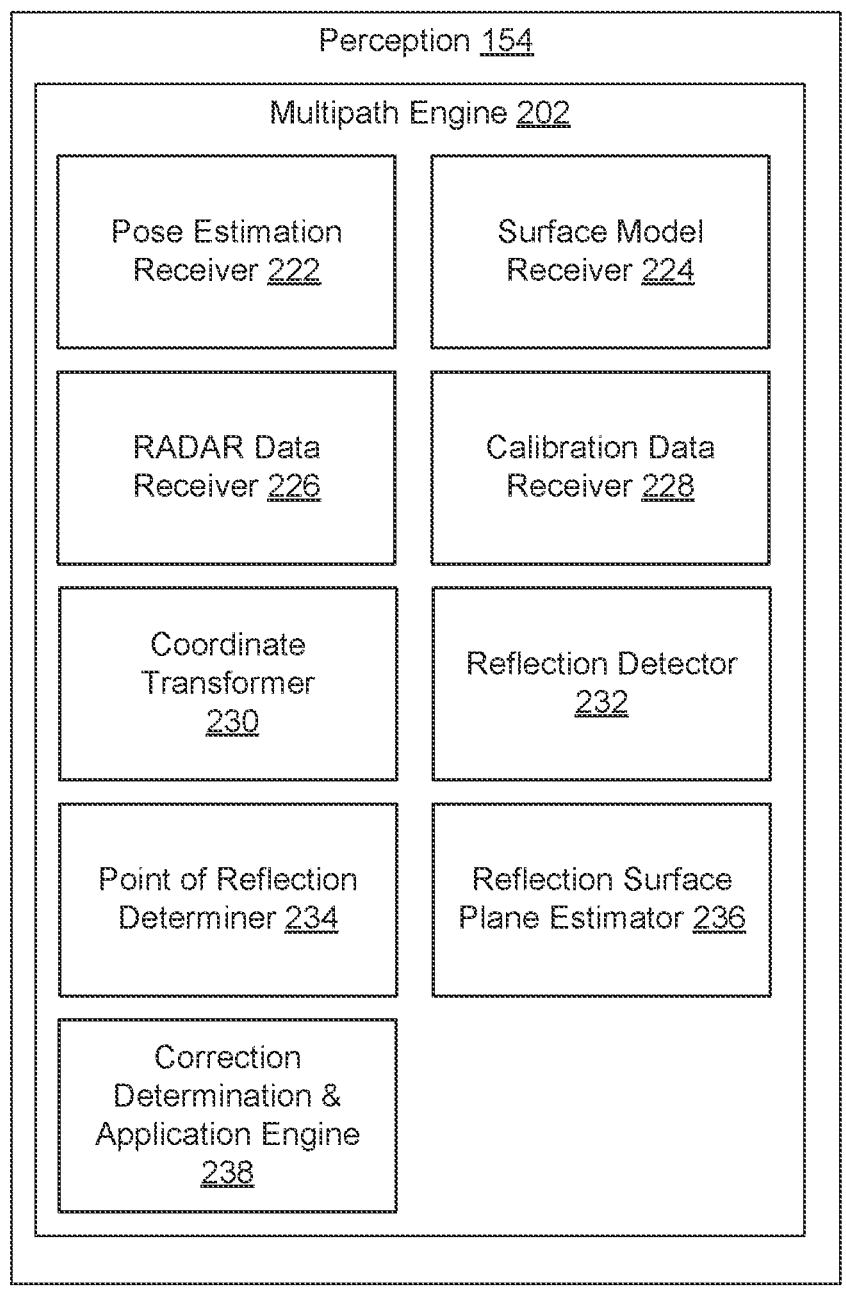
FIG. 2 is a block diagram of a multipath engine in accordance with some implementations.

As described above, the perception subsystem 154 is responsible for detecting, tracking, and/or identifying objects within the environment surrounding vehicle 100. In some implementations, the perception subsystem 154 includes a multipath engine 202 to detect or correct for multipath reflection, as is illustrated in FIG. 2. However, in other implementations, which are not shown, the features and functionality of the multipath engine 202 or its subcomponents may be located and/or executed on the vehicle 100, on the computing system 172, or on any suitable system.

Referring to FIG. 2, a block diagram of a multipath engine 202 in accordance with some implementations is illustrated. In the illustrated implementation, the multipath engine 202 comprises a pose estimation receiver 222, a surface model receiver 224, a RADAR data receiver 226, a calibration data receiver 228, a coordinate transformer 230, a reflection detector 232, a point of reflection determiner 234, a reflection surface plane estimator 236, and a correction determination and application engine 238, which are described in detail below.

The pose estimation receiver 222 receives a pose estimation. As described above, the localization subsystem 152 determines the location and orientation (also sometimes referred to as "pose" or "pose estimation") of the vehicle 100. In some implementations, the pose estimation receiver 222 receives the pose estimation from the localization 152 subsystem. In some implementations, the pose is stored within the memory 124 as localization data 127, and the pose estimation receiver 222 receives the pose estimation by retrieving the pose estimation from the memory 124.

The surface model receiver 224 receives a surface model. The surface model models the surface(s) off which detection and ranging signal may have reflected. For example, a surface model may include a surface model of the ground surface between the vehicle 100 and the object(s) detected by the detection and ranging sensor(s).

For clarity and convenience, the description herein refers to an example in which the detection and ranging sensor(s) are the RADAR sensors 134, the surface being modeled is the surface of a road, occasionally referred to herein as the "road surface," and the road surface reflects a portion of a radar signal (e.g., a type of electromagnetic wave) that previously reflected at an object (e.g., a vehicle). Therefore, at least a subset of the RADAR data 129 generated by the RADAR sensor 134 is inaccurate, as it includes one or more points produced as a result of multipath reflection due to the reflection at the road surface. However, it should be recognized that this is merely an illustrative and exemplary scenario, and that the multipath engine 202 may be adapted to use other ranging and detection technologies using other forms of electromagnetic radiation (e.g., LIDAR and light, rather than RADAR and radio waves), and that such adaptations are within the scope of this disclosure. It should further be recognized that the ground, or road, surface is merely an illustrative and exemplary scenario, and the that the multipath engine 202 may be adapted to correct for multipath reflection off of other surfaces, including, but not limited to, a guard rail or Jersey barrier, a sound wall, other structures, flat traffic signs, another vehicle, truck trailers, etc., some of which are described with reference to FIG. 4 and FIG. 5.

In some implementations, the surface model receiver 224 receives a surface model that has been previously generated. In other implementations, the surface model receiver 224 receives a surface model by generating the surface model from a three-dimensional map that includes surface information ad-hoc. In some implementations, the three-dimensional map is a high-definition map of the type used by autonomous vehicles, which provide the location of the ground surface. In some implementations, other information such as signs and traffic lanes can be provided by the three-dimensional map. In some implementations, the three-dimensional map may be generated or updated dynamically by the vehicle 100, itself, as the vehicle 100 drives, while in other implementations the three-dimensional map may include historic information (e.g., from other vehicles that have driven the area recently, etc.). In some implementations, the surface model receiver 224 receives a surface model of a passing vehicle from the perception subsystem 154, which may be generated by data from one or more of a RADAR sensor 134, a LIDAR sensor 136, and a Camera 140.

The RADAR data receiver 226 receives RADAR data 129 generated by the RADAR sensor 134. As mentioned above, the example described herein refers to RADAR, but the description may be adapted to other detection and ranging, such as LIDAR. The RADAR data 129 may occasionally be referred to as a point cloud, and comprises multiple points, which are associated with one or more objects detected by the RADAR sensor 134.

The calibration data receiver 228 receives calibration data describing the relationship of the ranging and detection sensor(s) to the vehicle. For example, the calibration data may describe the location of the RADAR sensor 134 in relation to the center of the rear axle, or any other reference point, on the vehicle 100. In some implementations the calibration information may be set at the factory. In some implementations, the calibration information may be modified or recalibrated, e.g., when a ranging and detection sensor or a component to which one is mounted is replaced.

The coordinate transformer 230 transforms data into a common coordinate system. Depending on the implementation, the various forms of raw data may use different coordinate systems and/or units. For example, as a non-limiting example of the possible variety of coordinate systems, consider that the vehicle pose estimation may use the XYZ Cartesian coordinate system or a homogeneous UVW inverse spherical coordinate system, while the surface model 128 uses the XYZ Cartesian coordinate system, and the ranging and detection (RADAR or LIDAR) point cloud may use a polar or spherical coordinate system. Use of a common coordinate system may beneficially simplify subsequent calculations and determinations. In one implementation, the common coordinate frame is the cartesian coordinate system, while in other embodiments, a different coordinate system may be the common coordinate system.

To summarize and simplify, the vehicle pose estimation provides the orientation and location of the vehicle 100. The calibration data 125 provides the location of the ranging and detection sensor, i.e., the RADAR sensor 134 of the example described herein, on the vehicle 100, e.g., how high off the ground and where on the vehicle the sensor is mounted. The surface model describes the surface(s) around the vehicle 100. Specifically, in the detailed example described herein, the surface model is a surface model of the road surface. However, the surface model may model other surfaces, such as building, guardrails, sound walls, etc. and be used to identify or correct for reflections off of such surfaces. The ranging and detection data, RADAR data points as described in the example herein, describes what the ranging and detection sensor has detected or "sees." The coordinate transformer 230 obtains these data and transforms them into a common coordinate system including the RADAR sensor 134 and the RADAR points in spatial-to-spatial relation to the ground surface (as modeled).

For clarity and convenience, the features and functionality of the reflection detector 232, point of reflection determiner 234, reflection surface plane estimator 236, and correction determination and application engine 238 are described with reference to the example scenarios illustrated in FIG. 3, FIG. 4, and FIG. 5.

Figure 3:
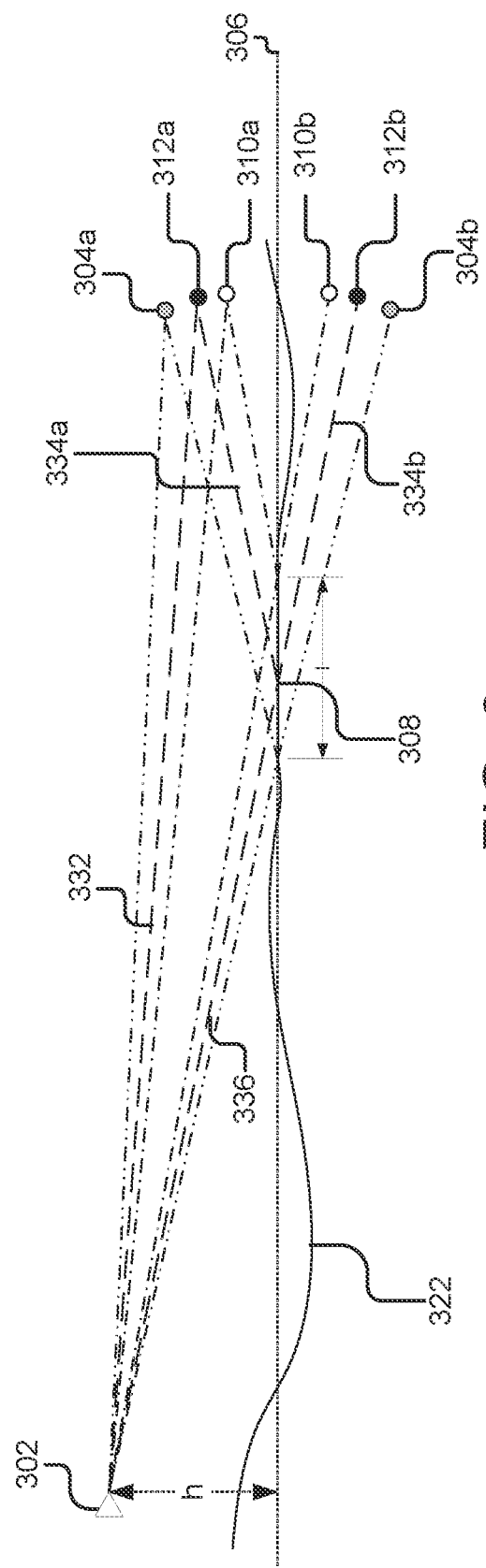
FIG. 3 is a diagram illustrating a ground surface and an example of the multipath problem in accordance with some implementations.

Referring now to FIG. 3, a diagram illustration an example of the multipath problem involving a ground surface reflection is illustrated in accordance with some implementations. FIG. 3 illustrates a detection and ranging sensor 302 located a dimension "h" above a plane 306 based on the surface 322 in a neighborhood of a point of reflection 308, which acts as a line of linear symmetry, and the points 304a, 310a, and 312a are, therefore, mirror images of the points 304b, 310b, and 312b, respectively, across the plane 306; dashed lines (e.g. 332, 334a, and 336) illustrate a path of an electromagnetic wave that reflects at point 312a and at the point of reflection 308; and dashed line 334b, which is based on the incidence (e.g., the angle of incidence or the azimuth) of the electromagnetic wave received along dashed line 336.

The detection and ranging sensor 302 (e.g., the RADAR sensor 134) emits an electromagnetic wave illustrated by a dashed line 332. The electromagnetic wave 332 is reflected at the point 312a. Assume the electromagnetic wave 332 is not reflected at point 312a back to the sensor 302 along dashed line 332, which would be a direct path. Rather, the reflected electromagnetic wave 334a, is not directly received by the sensor 302. Rather, the reflected electromagnetic wave 334a can intersect at a point of reflection 308 with a surface 322 (e.g., ground or road surface in this example). In this example, the surface 322 can be modeled by a surface model (not shown). The surface model can represent one or more surfaces depending on the implementation and use case. Examples of surfaces that may be modeled by the surface model include, but are not limited to, surfaces of infrastructure such as road surfaces, an underside of a bridge, surfaces of a tunnel, sound wall surface, traffic barriers, building facades, and surfaces of surrounding traffic, such as surfaces associated with a side or back of a vehicle. The reflected electromagnetic wave 334a is reflected at the point 308, and the reflected electromagnetic wave 336 is received by the sensor 302. Where the sensor 302 received the returning, reflected electromagnetic wave was incident along dashed line 336 and the sensor 302 determines (incorrectly in this scenario) the return signal followed a direct path illustrated by dashed line 336 and 334b, the sensor data (e.g., the RADAR data 129) indicates that there is an object located at point 312b (not at 312a). However, as received electromagnetic wave 336 in this scenario was reflected at more than one point (i.e., at point 312a and at point 308), the point 312b determined by the sensor 302 is the result of multipath reflection. Detection or correction of a multipath reflection point, such as 312b, beneficially results in data that more accurately identifies objects and their locations.

Figure 4:
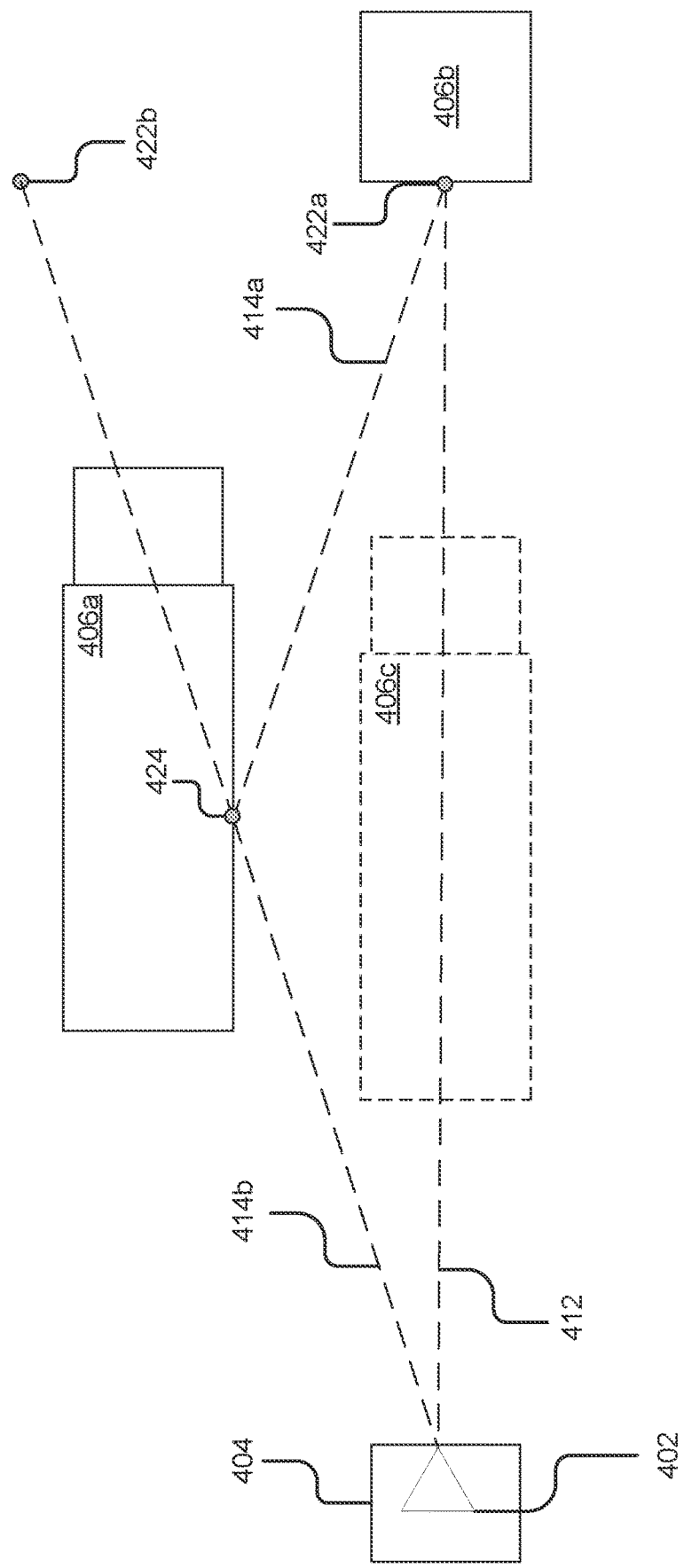
FIG. 4 is a diagram illustrating a top-view of multiple vehicles and another example of the multipath problem in accordance with some implementations.

FIG. 4 is a top view showing multiple vehicles 404 and 406a-c illustrating another example of the multipath problem in accordance with some implementations. Referring now to FIG. 4, a detection and ranging sensor 402 (e.g., a RADAR sensor 134), which is coupled to the vehicle 404, emits an electromagnetic wave illustrated by a dashed line 412. Ignoring, for now, the vehicle 406c, which is illustrated in dashed lines and is discussed further below, the electromagnetic wave 412 is reflected at the point 422a on the surface of a vehicle 406b. The reflected electromagnetic wave 414a may not be directly received by the sensor 402. Rather, the reflected electromagnetic wave 414a can intersect at the point of reflection 424 on a surface of a vehicle 406a. In this example, the surface (i.e., the side of the truck can be modeled by a surface model. This surface model can be the same or a similar surface model described above with reference to FIG. 3. The electromagnetic wave 414a is reflected and the reflected electromagnetic wave 414b can be received by the sensor 402. Because the sensor 402 received the return signal incident along dashed line 414b and determines the return signal followed a direct path, the sensor data (e.g., the RADAR data 129 point) indicates that there is an object at point 422b (not at 422a). However, as received electromagnetic wave 414b in this scenario was reflected at more than one point (e.g., at point 422a and at point 424), the point 312b determined by the sensor 302 is the result of a multipath reflection. Detection or correction of a multipath reflection point, such as 422b, beneficially results in data that more accurately identifies objects and their locations.

It should be noted that, when vehicle 406c is not present, there is a direct path available, e.g., along the dashed line of 412 and the object may be detected through reflections returning along this direct path. However, the detection and correction of the multipath reflection point, as described herein, may provide additional data to the perception subsystem 154 and algorithms to supplement the data from the direct path and better track the object, e.g., vehicle 406b. It should further be noted that, when there is no direct path, e.g., when the direct path is blocked by an object (e.g., there is a vehicle 406c between sensor 402 and vehicle 406b, as illustrated) detection and correction of the multipath reflection point beneficially enables identification and tracking of obscured objects, such as vehicle 406b, which is not available in existing solutions.

Figure 5:
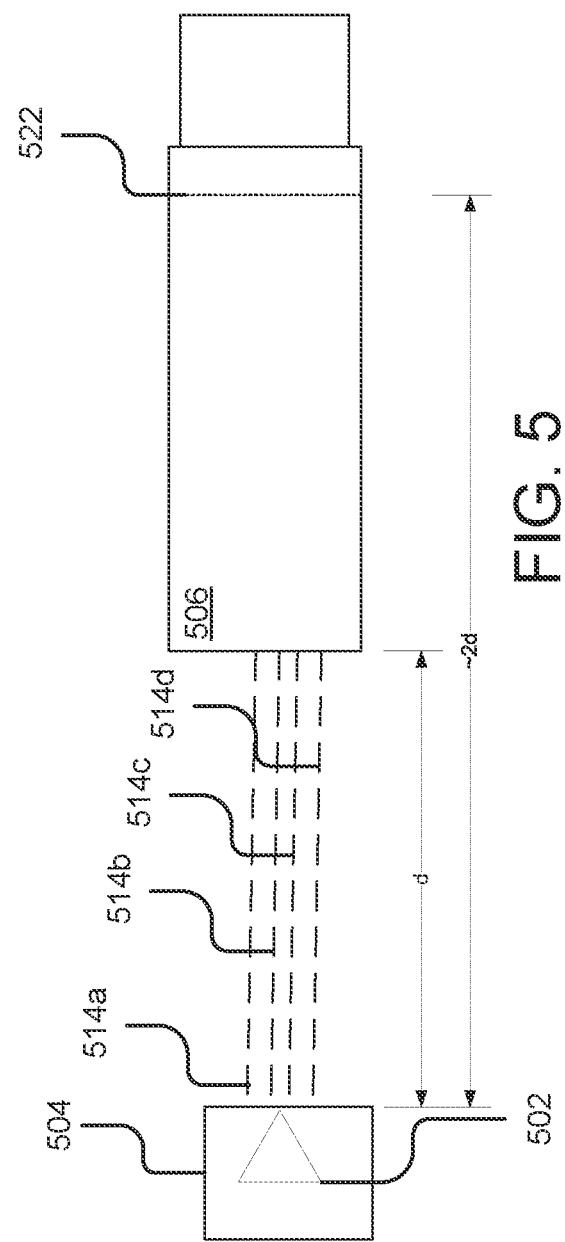
FIG. 5 is a diagram illustrating a top-view of multiple vehicles and yet another example of the multipath problem in accordance with some implementations.

FIG. 5 is a top view showing vehicles 504 and 506 and illustrating yet another example of the multipath problem in accordance with some implementations. Referring now to FIG. 5, detection and ranging sensor 502 (e.g., a RADAR sensor 134), which is coupled to vehicle 504, emits electromagnetic waves illustrated by dashed line 514a, which reflects off of the back surface of truck 506. That reflection, which is illustrated by dashed line 514b, may not be received at this time by the sensor 502. Rather, the reflection may be reflected off of a surface of the vehicle 504, as illustrated by dashed line 514c, which may, again, be reflected off the back surface of the truck 506, as illustrated by dashed line 514d, before being received by sensor 502. As the electromagnetic wave reflects more than once before being received (i.e., the electromagnetic wave reflects at the truck, the vehicle 504, and the truck 506 again), this multi-bounce scenario produces a multipath reflection point. While the distance between the sensor 502 and the back surface of truck 506 is illustrated as "d," this "double bounce" multipath generates data that incorrectly identifies a surface, illustrated by dotted line segment 522, at a distance of approximately 2d. It should be recognized that, while lines 514a-d are shown next to one another for ease of illustration and description, the electromagnetic waves may overlap in space. Additionally, it should be recognized that while a double bounce is described, the description herein may be applied to a double, triple, or $n^{th}$ bounce. Detection and elimination of such multi-bounce multipath reflection points beneficially results in data that more accurately identifies objects and their locations.

The reflection detector 232 determines whether a sensor point is a result of multipath reflection. In some implementations, a sensor point is a result of multipath reflection based on whether a path between the sensor point and the sensor intersects a surface of the surface model. In some implementations, a sensor point is a result of a multipath reflection based on its location relative to the surface of a surface model. For example, a sensor point (e.g., 312b of FIG. 3 or 422b of FIG. 4) is determined to be a product of a multipath reflection, by the reflection detector 232, when the sensor point is determined to be located beyond the surface of the surface model (e.g., below surface 322 in FIG. 3 or beyond the side of vehicle 406a in FIG. 4). In some implementations, the reflection detector selects a sensor point from the set of ranging and detection points (e.g., point 312b from a RADAR point cloud), and determines that point's altitude relative to the altitude of the ground surface, and determines whether the point is a product of multipath reflection. The reflection detector 232 then proceeds to the next sensor point in the detection and ranging data set.

In some implementations, the reflection detector 232 determines that a sensor point is a multipath reflection point when the altitude of the sensor point is beyond the surface of the surface model, e.g., below a ground surface in a ground surface model or behind a structure or vehicle surface in the surface model. In some implementations, the reflection detector 232 determines a probability that the sensor point is a multipath reflection point, e.g., assuming a gaussian distribution. For example, referring again to FIG. 3, as described above, sensor point 312b, is a result of multipath reflection due to the reflection at point 312a and at the point of reflection 308 on surface 322. However, the sensor 302 may have some degree of error or uncertainty. For example, the sensor 302 may have an uncertainty in resolution of plus or minus a few degrees (or portions thereof) with regard to elevation. Therefore, the sensor point 312b could be as low as 304b or as high as 310b and, when corrected, 312a could be as high as 304a and as low as 310a. While not shown, imagine FIG. 3 was stretched horizontally, which could represent one or more of: the sensor 302 being mounted lower on a vehicle (i.e., closer to surface 322), the point of reflection 308 and point 312a being further away from the sensor 302, and point 312a being closer to surface 322. When stretched horizontally, the electromagnetic waves 334a and 336 would have a lower, glancing angle (i.e., closer to horizontal in the illustrated scenario), which could result in, e.g., 310a as being below surface 322 and 310b being above surface 322, particularly when uncertainty is increased (e.g., the resolution of the sensor is decreased and, accordingly, the spread between 304a and 310a or 304b and 310b increases). In scenarios where low, glancing angles or high uncertainty are present, accurately identifying whether or not the sensor point should be identified as a multipath reflection may become more difficult. In some implementations, a gaussian distribution is assumed and the sensor point is assigned a probability that the sensor point (e.g., point 312b) is a multipath, and a threshold may be set to accurately identify which, if any, sensor points are a result of multipoint reflection. In some implementations, the threshold may be set or subsequently modified using machine learning to optimize (e.g., for performance or accuracy).

In some implementations, the reflection detector 232 determines that a sensor point is a result of multipath reflection when the segment between the sensor point (e.g., referring to FIG. 4, point 422b) and the ranging and detection sensor (e.g., sensor 402) intersects a vertical surface (e.g., a trailer surface of a passing vehicle 406a at point 424). One example, when the vehicle 404 with a forward-facing RADAR sensor 134 (e.g., sensor 402) is following a truck with a trailer (e.g., vehicle 406b).

In some implementations, the reflection detector 232 determines whether a point is a result of multipath reflection by determining whether the distance between the sensor (e.g., 502 in FIG. 5) and the sensor point (e.g., located on segment 522 at a distance of 2d) satisfies a threshold distance. For example, the threshold distance can be approximately an integer multiple of a distance between the sensor 502 and a surface in the surface model (e.g., the back surface of truck 506). The threshold on distance for multipath reflection point determination may be chosen according to the radar distance measurement uncertainty, e.g., when the distance plus or minus up to three times of distance measurement uncertainty of the sensor produces an integer multiple of the distance between the sensor and the surface in the surface model. In some implementations, the reflection detector 232 determines whether a sensor point is a result of a multipath reflection by determining whether the distance between the sensor and point of intersection with a surface in a surface model, is approximately a unit fraction of a distance between the sensor point and the sensor. For example, an intersection with a surface at approximately half the distance of the sensor point may indicate a double bounce, an intersection with a surface at approximately one-third the distance of the sensor point may indicate a triple bounce, etc. In some implementations, the reflection detector 232 determines whether a point is a result of multipath reflection by determining whether the distance between the sensor (e.g., 502 in FIG. 5) and the sensor point (e.g., located on segment 522 at a distance of 2d) is approximately an integer multiple of a distance between the sensor 502 and a point in the same direction but at a closer distance, for example, a sensor point caused by single bounce reflection of the back surface of truck 506, without using a surface model. In some implementations, the reflection detector 232 determines whether a point is a result of a multi-bounce type multipath reflection by, in addition to distance check, determining whether the Doppler of the sensor point is approximately an integer multiple of the Doppler of a point in the same direction but at a closer distance, for example, the radar point caused by single bounce reflection of the back surface of truck 506.

In some implementations, the point may be identified, or classified, as a product of multipath reflection, which may be corrected as described below, or not. In other implementations, based on the probability a sensor point is a multipath reflection point, the sensor point may be identified as a multipath reflection point (e.g., satisfies a first threshold), which may be corrected as described below, identified as not a multipath reflection point (e.g., satisfies a second threshold), or identified as uncertain whether the sensor point is a multipath reflection point (e.g., probability is between the first and second threshold). A sensor point where it is uncertain whether the sensor point is a result of multipath reflection may be treated differently in different implementations, for example, the sensor point may be subject to additional processing, or omitted or removed from the data set. In some implementations, the probability of a sensor point being a multipath reflection point may be obtained by the perception subsystem 154, e.g., as an additional feature for an object detector using machine learning.

The point of reflection determiner 234 determines a point of reflection for a sensor point determined to be a multipath reflection point, e.g., a sensor point resulting from multipath reflection. In some implementations, the point of reflection is determined to be the intersection point of the surface from the surface model and the segment connecting the RADAR sensor 134 and the sensor point determined to be a multipath reflection point. Referring to FIG. 3, the reflection point 308 is the intersection of the surface model of surface 322 and the segment 336 and 334b between the sensor 302 and point 312b. Depending on the implementation, the intersection, i.e., the point of reflection 308 may be found using various methods. In one implementation, described below with reference to FIG. 9, a binary search is applied by the point of reflection determiner 234 to identify the intersection. In another implementation, the point of reflection determiner 234 applies a linear step progression to identify the intersection.

The reflection surface plane estimator 236 determines, from the surface model, a surface plane at the point of reflection associated with a multipath reflection point. In some implementations, the reflection surface plane estimator 236 queries the neighborhood around the point of the reflection to estimate the surface plane at the point of reflection, for example, by computing the normal. The size of the neighborhood and the resolution at which the neighborhood is queried varies depending on the implementation. In some implementations, the neighborhood may be a defined value, for example, a four-meter radius. In some implementations, the neighborhood may be based on a resolution of equipment, such as the RADAR sensor 134 or HD map.

In some implementations, the neighborhood is larger than the resolution of the HD map and/or surface model. For example, in one implementation, the neighborhood may be four times the resolution of the surface model. Such implementations may benefit by not overfitting for local variation in the surface at the point of reflection.

Referring again to FIG. 3, the point of reflection is at point 308, and the neighborhood around point 308 is illustrated as having the diameter 1, which is also illustrated as the distance between the points of reflection associated with the high and low bounds of uncertainty for the sensor 302 (associated with points 310a/b and 304a/b). The surface model of surface 322 in the neighborhood of 308 is illustrated as flat for convenience and ease of illustration and explanation. The height, h, is the vertical distance between the sensor 302 and vertical plane 306 in which the point of reflection, point 308, lies.

The correction determination and application engine 238 determines and applies a correction to a multipath reflection point. In some implementations, the correction determination application engine 238 determines and applies the correction by eliminating or ignoring a point. For example, when a point is determined to be a product of a double bounce, the correction determination and application engine 238, may ignore or remove the point from the point cloud. In the alternative, the correction determination application engine 238 may determine a number of bounces and adjust the distance of the point accordingly (e.g., by dividing by the detected distance of the point by a number of determined bounces). For example, the correction and determination engine may halve, in the case of a double bounce such as that described with reference to FIG. 5, the distance of the sensor points from the sensor 502 so that the sensor points along dotted line 522 are relocated along the back surface of vehicle 506.

In some implementations, the correction determination and application engine 238 determines the correction by mirroring the sensor point through the estimated plane. Referring, again, to FIG. 3, the neighborhood around 308 was horizontal, and the horizontal plane intersecting the point of reflection 308 is extended and illustrated by line 306. For ease of illustration and discussion, in the illustrated example, when the original sensor point 312b is mirrored across plane 306, the correction determination and application engine 238 obtains a corrected point at point 312a, which, as described above, is the first point of reflection described with reference to FIG. 3. However, it should be recognized that the point spatially, or geometrically, corrected for multipath reflection off of the ground surface may not be corrected to the exact position of point 312a, as is illustrated, but may be slightly offset due to any number of reasons including, but not limited to, the resolution of the surface model, the size of the neighborhood sampled around the point of reflection 308, the number of samples, etc.

The correction determination and application engine 238 may apply the correction differently in different implementations. In some implementations, the original sensor point may be replaced with the corrected point. For example, point 312a may overwrite sensor point 312b in the RADAR data 129. In some implementations, a difference between the original sensor point and the corrected point may be applied to the RADAR data 129. For example, the RADAR data stores point 312b and a correction up N units and over O units, to describe the position of point 312a relative to point 312b. In some implementations, the correction may be applied so as to retain the original data. For example, the RADAR data 129 includes an original data column (e.g., storing point 312b), and the correction determination and application engine 238 populates a corrected data column with corrections (e.g., 312a) and, for points that are not multipath reflection points, the data from the original data column is copied into the corrected data column.

Data Flow

Figure 6:
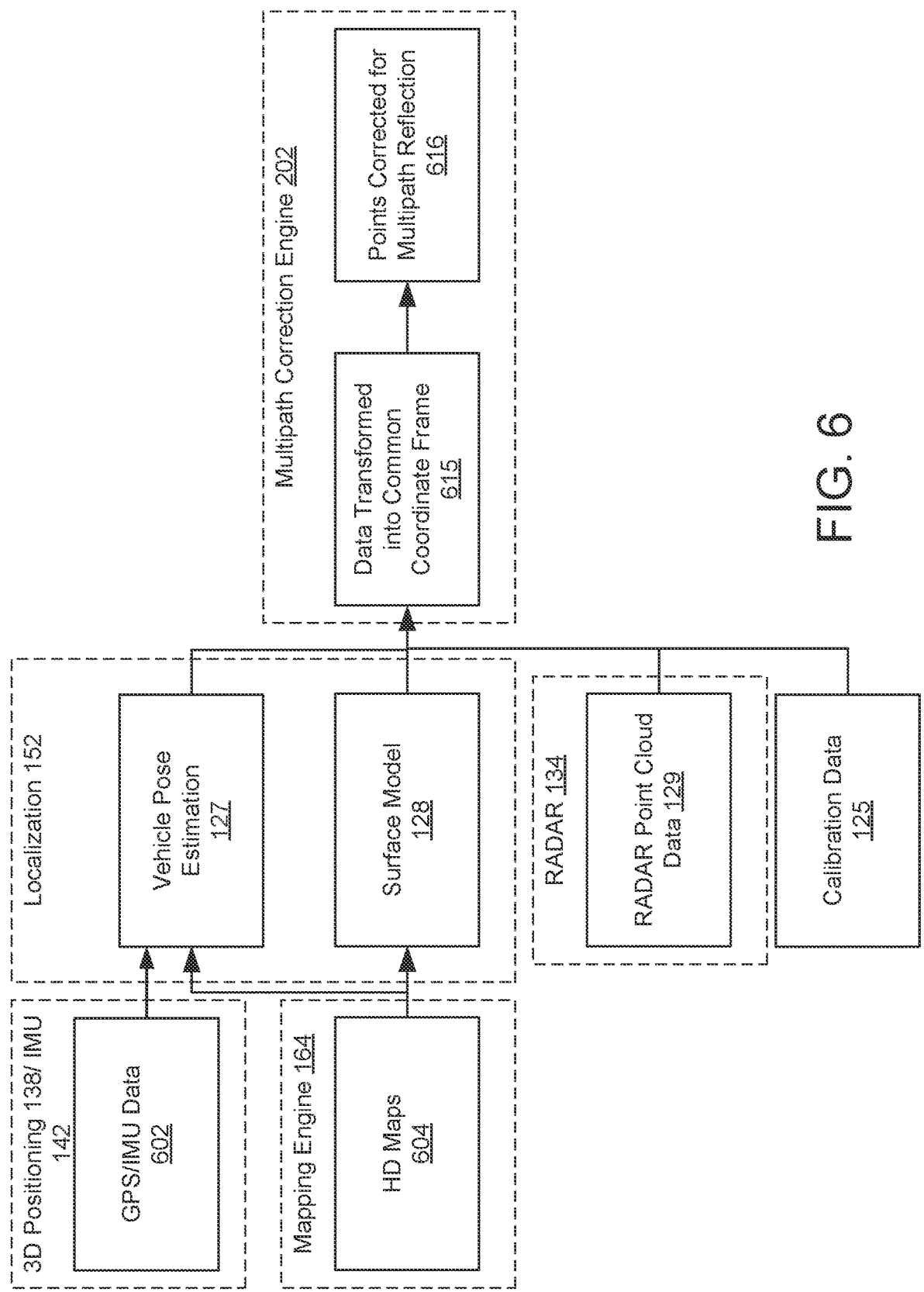
FIG. 6 is a block diagram illustrating an example data flow in accordance with some implementations.

Referring now to FIG. 6, a block diagram illustrating an example data flow through the multipath engine 202 and its subcomponents is described in accordance with some implementations. GPS and IMU data 602 are generated by the 3D positioning and IMU 142 sensors, respectively. One or more HD maps 604 are generated or maintained by the mapping engine 164. The localization subsystem 152 obtains the HD map of the vehicle 100 location and, along with GPS, IMU or both data 602, determines a vehicle pose estimation of the vehicle 100 location and orientation, which may be stored as localization data 127. The localization subsystem 152 uses the HD map to generate a surface model 128. The multipath engine 202 obtains the vehicle pose estimation, the surface model 128, the RADAR point cloud data 129 generated by the RADAR sensor 134 (e.g., with elevation resolution capability), and calibration data 125. The multipath engine 202 transforms the data into a common coordinate frame 615 and determines a set of points 616 with corrections for multipath reflection. Depending on the implementation, the original sensor point, which was determined to be a result of multipath reflection, may or may not be retained. For example, in some implementations, the original point may be retained and tagged or associated with the corrected point so that subsequent analysis may be performed on the data to gain insights. In another example, in some implementations, the point resulting from the correction for multipath reflection may replace, or overwrite, the original sensor point, which was determined to be a result of multipath reflection.

Methods

Figure 7:
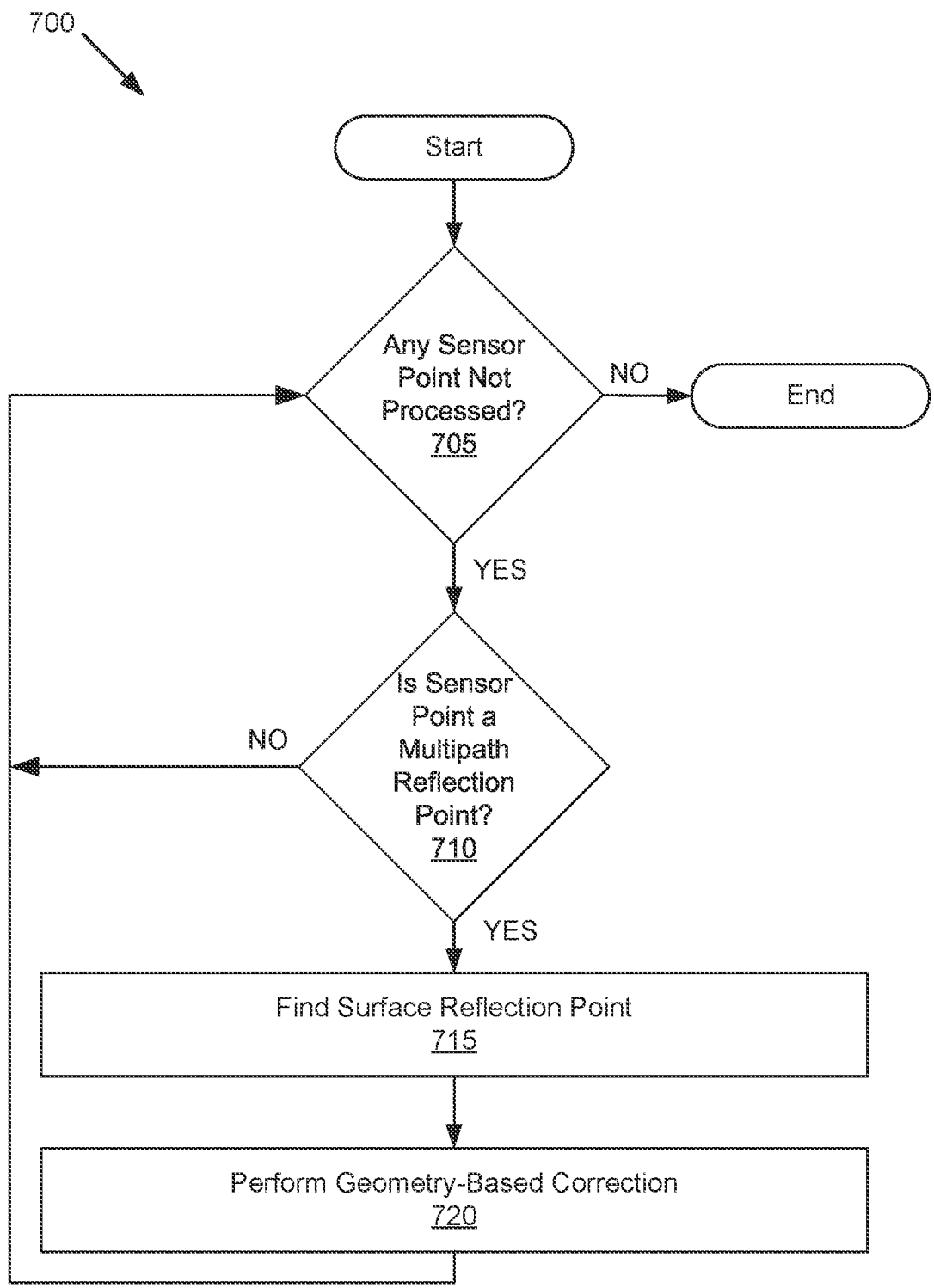
FIG. 7 is an example flowchart illustrating a method for correcting for multipath reflection in accordance with some implementations.

FIG. 7 is a block diagram illustrating an example flowchart of a method 700 for correcting for a multipath reflection in accordance with some implementations. At block 705, the multipath engine 202 determines whether any sensor point is unprocessed. When the multipath engine 202 determines that no point is unprocessed (705—NO), the method 700 ends. When the multipath engine 202 determines that a sensor point has not been processed (705—YES), an unprocessed sensor point is selected and a determination is made, at block 710, as to whether that sensor point is a result of multipath reflection.

When it is determined that the sensor point is not a multipath reflection point (710-NO), the method 700 returns to block 705. Blocks 705 and 710 are repeated until it is determined that no sensor point remains unprocessed (705—NO), and the method 700 ends, or it is determined, at block 710, that the sensor point is a result of multipath reflection. When it is determined that a sensor point is a result of multipath reflection (710—YES), the method continues at block 715.

At block 715, the surface reflection point is found. At block 720, a geometry-based correction is performed, and the method 700 returns to block 705. Blocks 705, 710, 715, and 720 are repeated until all points are processed by the method 700 and determined not to be a multipath reflection point (710-NO) or are determined to be a multipath reflection point (710—YES) and subsequently corrected at block 720.

Figure 8:
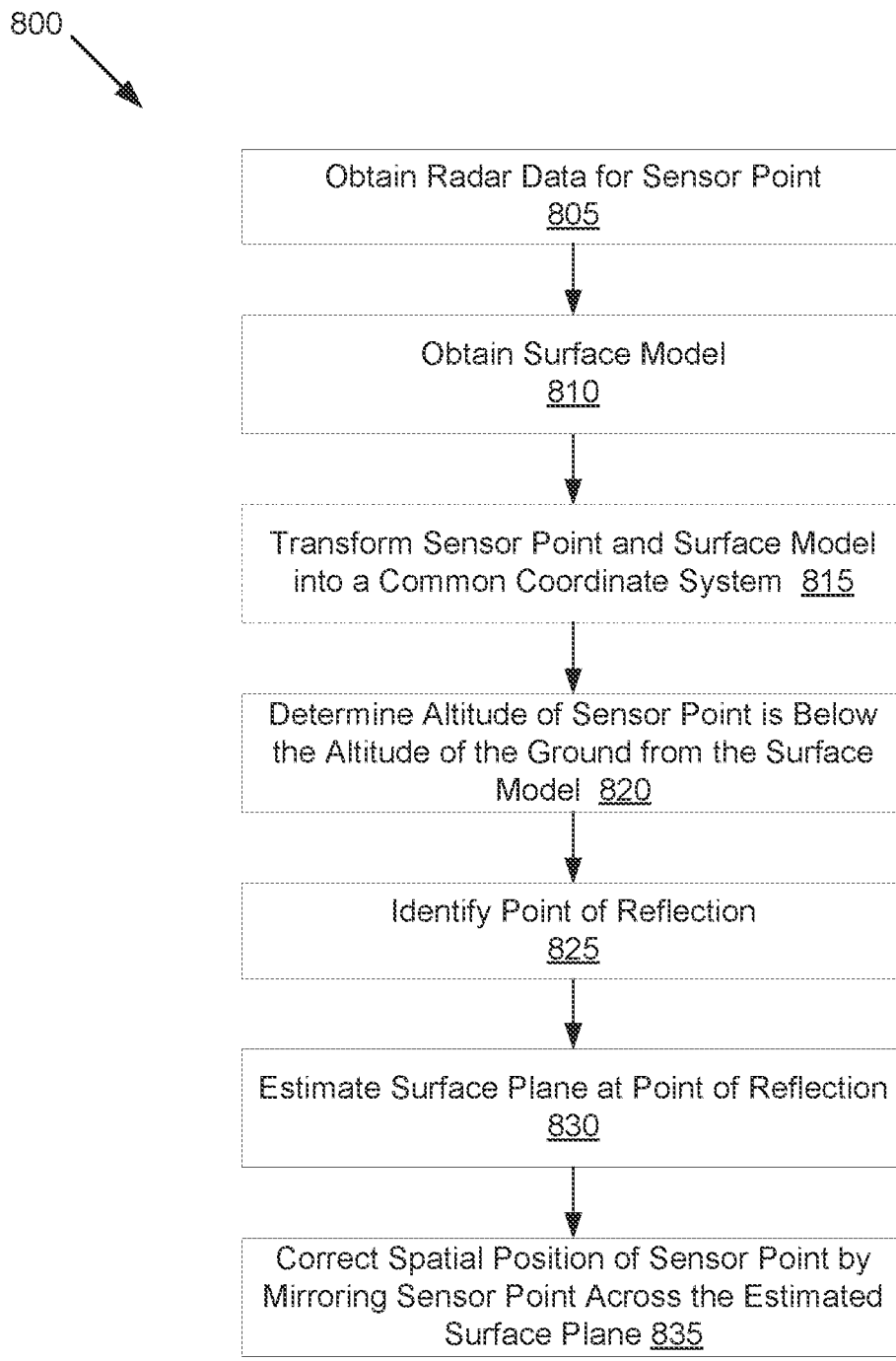
FIG. 8 is another example flowchart illustrating a method for correcting for multipath reflection in accordance with some implementations.

FIG. 8 is a block diagram illustrating an example flowchart of a method 800 for correcting for multipath reflection in accordance with some implementations. At block 805, the RADAR data for a sensor point is obtained. At block 810, the surface model is obtained. At block 815, the sensor point and surface model are, in some implementations, transformed into a common coordinate system. Block 815 is depicted with dashed lines as it is optional in certain implementations. At block 820, the altitude of the sensor point is determined to be below the altitude of the ground from the surface model obtained at block 810, and, therefore, beyond the ground surface. At block 825, the point of reflection is identified. At block 830, the surface plane is estimated at the point of intersection. At block 835, the spatial position of the sensor point is corrected by mirroring the sensor point across the surface plane estimated at block 830.

Figure 9:
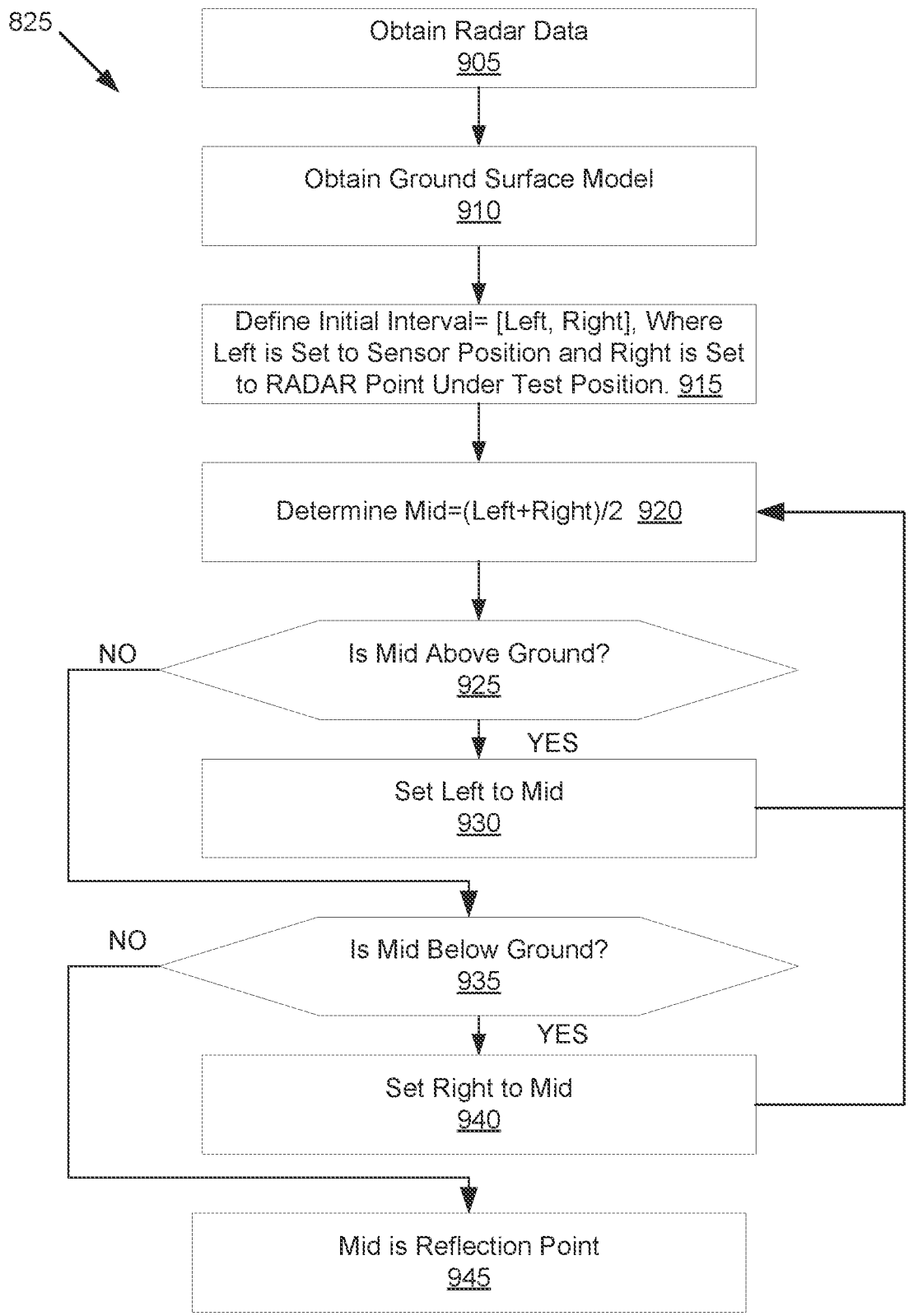
FIG. 9 illustrates a flowchart of a method for determining a point of reflection in accordance with some implementations.

FIG. 9 illustrates a flowchart of a method 900 for determining a point of reflection in accordance with some implementations. At block 905, the RADAR data is obtained. At block 910, a ground surface model is obtained. At block 915, an initial interval is defined [Left, Right], where the Left is set as the sensor position, and Right is set to the RADAR sensor point. At block 920, a midpoint, Mid, is determined as equal to (Left+Right)/2. At block 925, a determination is made as to whether the midpoint, Mid, is above the ground represented by the ground surface model.

When it is determined, at block 925, that the midpoint, Mid, is above the ground (925—YES), the method 900 proceeds to block 930. At block 930, the Left value is set to the midpoint, Mid, value, and the method continues at block 920, where a new midpoint, Mid, is determined. Blocks 920, 925, and 930 are repeated until it is determined, at block 925, that the midpoint, Mid, is not above the ground (925-NO).

When it is determined, at block 925, that the midpoint, Mid, is below the ground (935—YES), the method 900 proceeds to block 940. At block 940, the Right value is set to the midpoint, Mid, value, and the method continues at block 920 where a new midpoint, Mid, is determined. Blocks 920, 925, 930, 935, and 940 are repeated until it is determined, at block 935, that the midpoint, Mid, is not below the ground (935-NO), and the method 900 proceeds to block 945, where the midpoint, Mid, is the reflection point.

Other Considerations

The previous description is provided to enable practice of the various aspects described herein. Various modifications to these aspects will be understood, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout the previous description that are known or later come to be known are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

It is understood that the specific order or hierarchy of blocks in the processes disclosed is an example of illustrative approaches. Based upon design preferences, it is understood that the specific order or hierarchy of blocks in the processes may be rearranged while remaining within the scope of the previous description. The accompanying method claims present elements of the various blocks in a sample order, and are not meant to be limited to the specific order or hierarchy presented.

The previous description of the disclosed implementations is provided to enable others to make or use the disclosed subject matter. Various modifications to these implementations will be readily apparent, and the generic principles defined herein may be applied to other implementations without departing from the spirit or scope of the previous description. Thus, the previous description is not intended to be limited to the implementations shown herein but is to be accorded the widest scope consistent with the principles and novel features disclosed herein.

The various examples illustrated and described are provided merely as examples to illustrate various features of the claims. However, features shown and described with respect to any given example are not necessarily limited to the associated example and may be used or combined with other examples that are shown and described. Further, the claims are not intended to be limited by any one example.

The foregoing method descriptions and the process flow diagrams are provided merely as illustrative examples and are not intended to require or imply that the blocks of various examples must be performed in the order presented. As will be appreciated, the order of blocks in the foregoing examples may be performed in any order. Words such as "thereafter," "then," "next," etc. are not intended to limit the order of the blocks; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm blocks described in connection with the examples disclosed herein may be implemented as electronic hardware, computer software, or combinations of both. To clearly illustrate this interchangeability of hardware and software, various illustrative components, blocks, modules, circuits, and blocks have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The hardware used to implement the various illustrative logics, logical blocks, modules, and circuits described in connection with the examples disclosed herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some blocks or methods may be performed by circuitry that is specific to a given function.

In some examples, the functions described may be implemented in hardware, software, firmware, or any combination thereof. If implemented in software, the functions may be stored as one or more instructions or code on a non-transitory computer-readable storage medium or non-transitory processor-readable storage medium. The blocks of a method or algorithm disclosed herein may be implemented in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed examples is provided to enable others to make or use the present disclosure. Various modifications to these examples will be readily apparent, and the generic principles defined herein may be applied to some examples without departing from the spirit or scope of the disclosure. Thus, the present disclosure is not intended to be limited to the examples shown herein but is to be accorded the widest scope consistent with the following claims and the principles and novel features disclosed herein.

What is claimed is:

1. A method comprising:
   obtaining a location of a first sensor point that represents a location of an image of an object, wherein the first sensor point is associated with a mirror image of the object across a surface plane;
   determining that the first sensor point is a product of multipath reflection using a surface model;
   determining a first point of reflection on a surface of the surface model; and
   correcting the location of the first sensor point based on the first point of reflection on the surface of the surface model, wherein correcting the location of the first sensor point includes:
   determining a surface plane at the first point of reflection on the surface of the surface model at least in part by:
      querying a neighborhood of the first point of reflection on the surface of the surface model;
      computing a normal associated with the surface plane based on the neighborhood of the first point of reflection on the surface of the surface model, wherein the surface plane is based on the computed normal; and
   mirroring the first sensor point across the surface plane at the first point of reflection to represent the location of the object.

2. The method of claim 1, wherein the multipath reflection includes a reflection of an electromagnetic wave at the object and one or more other surfaces before the electromagnetic wave is received at a sensor.

3. The method of claim 1, wherein determining the first sensor point is a product of multipath reflection is based on the location of the first sensor point relative to the surface of the surface model.

4. The method of claim 1, further comprising:
   obtaining a second sensor point;
   determining that the second sensor point is the product of multipath reflection;
   determining a second point of reflection on the surface of the surface model; and
   correcting a location of the second sensor point based on the second point of reflection on the surface.

5. The method of claim 1, wherein determining the first point of reflection on the surface using at least one of a binary search and a linear step progression.

6. The method of claim 1, further comprising:
   incorporating the first sensor point and the surface model into a common coordinate system.

7. The method of claim 2, wherein the electromagnetic wave is one of light, wherein the sensor includes a light detection and ranging (LIDAR) sensor; and
   a radio wave, wherein the sensor includes a radio detection and ranging (RADAR) sensor.

8. The method of claim 1, wherein the first sensor point is determined to be the product of multipath reflection when an altitude of the first sensor point is determined to be below an altitude of the surface of the surface model, wherein the surface model is a model of a ground surface and based on a three-dimensional map.

9. The method of claim 1, wherein the object is a physical object and the surface model is generated from a three-dimensional map.

10. The method of claim 1, wherein the location of the image of the object represented by the location of the first sensor point, due to the multipath reflection, is the mirror image of the location of the object reflected across the surface plane.

11. A system comprising one or more processors and memory operably coupled with the one or more processors, wherein the memory stores instructions that, in response to execution of the instructions by one or more processors, cause the one or more processors to perform operations including:
   obtain a location of a first sensor point that represents a location of an image of an object, the first sensor point is associated with a mirror image of the object across a surface plane;
   determine that the first sensor point is a product of multipath reflection;
   determine a first point of reflection on a surface of a surface model; and
   correct the location of the first sensor point based on the first point of reflection on the surface of the surface model, wherein the operations to correct the location of the first sensor point including:
   determine a surface plane at the first point of reflection on the surface of the surface model at least in part by:
      query a neighborhood of the first point of reflection on the surface of the surface model;
      compute a normal associated with the surface plane based on the neighborhood of the first point of reflection on the surface of the surface model, wherein the surface plane is based on the computed normal; and
   mirror the first sensor point across the surface plane at the first point of reflection to represent the location of the object.

12. The system of claim 11, wherein the multipath reflection includes a reflection of an electromagnetic wave at the object and one or more other surfaces before the electromagnetic wave is received at a sensor.

13. The system of claim 11, wherein determining the first sensor point is a product of multipath reflection is based on the location of the first sensor point relative to the surface of the surface model.

14. The system of claim 11, wherein the operations further comprise:
   obtain a second sensor point;
   determine that the second sensor point is the product of multipath reflection;
   determine a second point of reflection on the surface of the surface model; and
   correct a location of the second sensor point based on the second point of reflection on the surface.

15. The system of claim 11, wherein determining the first point of reflection on the surface uses at least one of a binary search and a linear step progression.

16. The system of claim 11, wherein the operations further comprise:
   incorporate the first sensor point and the surface model into a common coordinate system.

17. The system of claim 12, wherein the electromagnetic wave is one of:
   light, wherein the sensor includes a light detection and ranging (LIDAR) sensor; and a radio wave, wherein the sensor includes a radio detection and ranging (RADAR) sensor.

18. The system of claim 11, wherein the first sensor point is determined to be the product of multipath reflection when an altitude of the first sensor point is determined to be below an altitude of the surface of the surface model, wherein the surface model is a model of ground surface and based on a three-dimensional map.

19. The system of claim 11, wherein the object is a physical object and the surface model is generated from a three-dimensional map.

20. The system of claim 11, wherein the location of the image of the object represented by the location of the first sensor point, due to the multipath reflection, is the mirror image of the location of the object reflected across the surface plane.

* * * * *